(12) United States Patent
Xu et al.

(10) Patent No.: US 6,859,372 B2
(45) Date of Patent: Feb. 22, 2005

(54) BRIDGE-BUCK CONVERTER WITH SELF-DRIVEN SYNCHRONOUS RECTIFIERS

(75) Inventors: Ming Xu, Blacksburg, VA (US); Fred C. Lee, Blacksburg, VA (US); Jinghai Zhou, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 75 days.

(21) Appl. No.: 10/454,779

(22) Filed: Jun. 5, 2003

(65) Prior Publication Data

US 2004/0246748 A1 Dec. 9, 2004

(51) Int. Cl.[7] ............................................. H02M 3/335
(52) U.S. Cl. ........................ 363/17; 363/127; 363/132
(58) Field of Search ............................. 363/16, 17, 37, 363/56.02, 71, 82, 98, 127, 132

(56) References Cited

U.S. PATENT DOCUMENTS 4,873,618 A * 10/1989 Fredrick et al. ............... 363/17
5,768,112 A * 6/1998 Barrett ........................... 363/16
6,504,739 B2 * 1/2003 Phadke ......................... 363/127
6,757,184 B2 * 6/2004 Wei et al. ....................... 363/71

* cited by examiner

Primary Examiner—Jessica Han
(74) Attorney, Agent, or Firm—Whitham, Curtis & Christofferson, P.C.

(57) ABSTRACT

A non-isolated bridge-buck DC—DC converter has self-driven synchronous rectifiers Q5 Q6 in the buck circuits 28 30. Gate electrodes of the synchronous rectifiers Q5 Q6 are connected to midpoints 24A 24B of the bridge circuit. The voltage at the midpoints provides the necessary voltage waveform for switching the synchronous rectifiers Q5 Q6. In another aspect of the invention, voltage shift circuits 34 are provided between the midpoints and the gates of the synchronous rectifiers. The voltage shift circuits are necessary in some embodiments to make sure that the synchronous rectifiers are turned completely OFF when necessary. The present invention provides a more power efficient and less expensive technique for controlling the synchronous rectifiers compared to conventional external driver circuitry.

20 Claims, 5 Drawing Sheets

Voltage Shift Circuit

Voltage Shift Circuit

Voltage Shift Circuit

Voltage Shift Circuit

BRIDGE-BUCK CONVERTER WITH SELF-DRIVEN SYNCHRONOUS RECTIFIERS

RELATED APPLICATIONS

The present invention is related to co-pending utility application having Ser. No. 10/339,576 filed on Jan. 10, 2003, titled "Step-Down Buck Converter With Full-bridge Circuit", and the complete contents of that application is herein incorporated by reference.

FIELD OF THE INVENTION

The present invention relates generally to electrical power supplies. More particularly, it relates to non-isolated DC—DC converters that have a bridge circuit combined with buck-output circuits where the synchronous rectifiers in the buck circuits are self-driven.

BACKGROUND OF THE INVENTION

Buck regulators are commonly used for changing the voltage or polarity of a power supply. Buck regulators typically employ two electronic switches (typically MOSFETs) in combination with an output inductor. The switches are alternately switched, thereby providing voltage pulses to the output inductor. The output inductor filters the pulse voltage to provide DC output voltage.

Isolated DC—DC converters are often implemented with self-driven synchronous rectifiers. Typically in this case, the synchronous rectifiers are driven with energy from a dedicated transformer winding. In a non-isolated DC—DC converter however, such as some bridge-buck circuits, no such winding is available. Nevertheless, a technique for self-driving synchronous rectifiers in a non-isolated converter could provide efficiency and cost advantages.

SUMMARY

The present invention includes a DC—DC converter having a bridge circuit and two buck output circuits connected to the bridge circuit. The bridge circuit has two legs, with each leg having a midpoint. Each buck output circuit has a synchronous rectifier with a gate. The gates of the synchronous rectifiers are connected to the midpoints. A transformer has a primary winding and a secondary winding which are connected across the bridge circuit legs. The midpoints provide the proper voltage waveform for driving the synchronous rectifiers.

The gates can be connected to the midpoint on the same side leg, or the opposite side leg, depending on the polarity of the transformer winding connections.

A voltage shift circuit can be provided in series with the gate to assure that the synchronous switches are turned OFF when necessary, or to assure that the gates do not receive excessive voltages. The voltage shift circuit can comprise a Zener diode, for example.

Preferably, the synchronous rectifiers have as small a gate resistance as possible, for example less than 1 Ohm or 0.5 Ohms (e.g. 0 Ohms). This reduces the power dissipated in driving the synchronous rectifiers, compared to externally driven synchronous rectifiers.

The circuit can be operated according to a complementary control scheme, for example.

The present invention includes an embodiment where the transformer windings have parallel polarity connections across the legs, and the synchronous rectifier gates are connected to opposite-side midpoints. This embodiment can also have voltage shift circuits.

The present invention also includes an embodiment where the bridge circuit has three or more legs, and three or more transformers are connected across the legs, with anti-parallel polarity connections. At least three buck output circuits are connected to the legs (one connected to each leg), and the synchronous rectifiers each have gates connected to midpoints of the legs. This embodiment can provide current tripling or quadrupling, for example.

In the present invention, the synchronous rectifiers are self driven because the synchronous rectifier gates are coupled to the midpoints.

DETAILED DESCRIPTION OF THE INVENTION

The present invention provides a bridge-buck type DC—DC converter having synchronous rectifiers that are self-driven. Specifically, the gates of the synchronous rectifiers are connected directly to or coupled to midpoints in the bridge circuit. The voltage at the bridge circuit midpoints turns on the synchronous rectifiers at appropriate times for operation of the DC—DC converter. The bridge circuit can be operated according to a complementary control scheme. Self-driving the synchronous rectifiers provides increased power efficiency, and obviates driver circuitry for the synchronous rectifiers.

Figure 1:
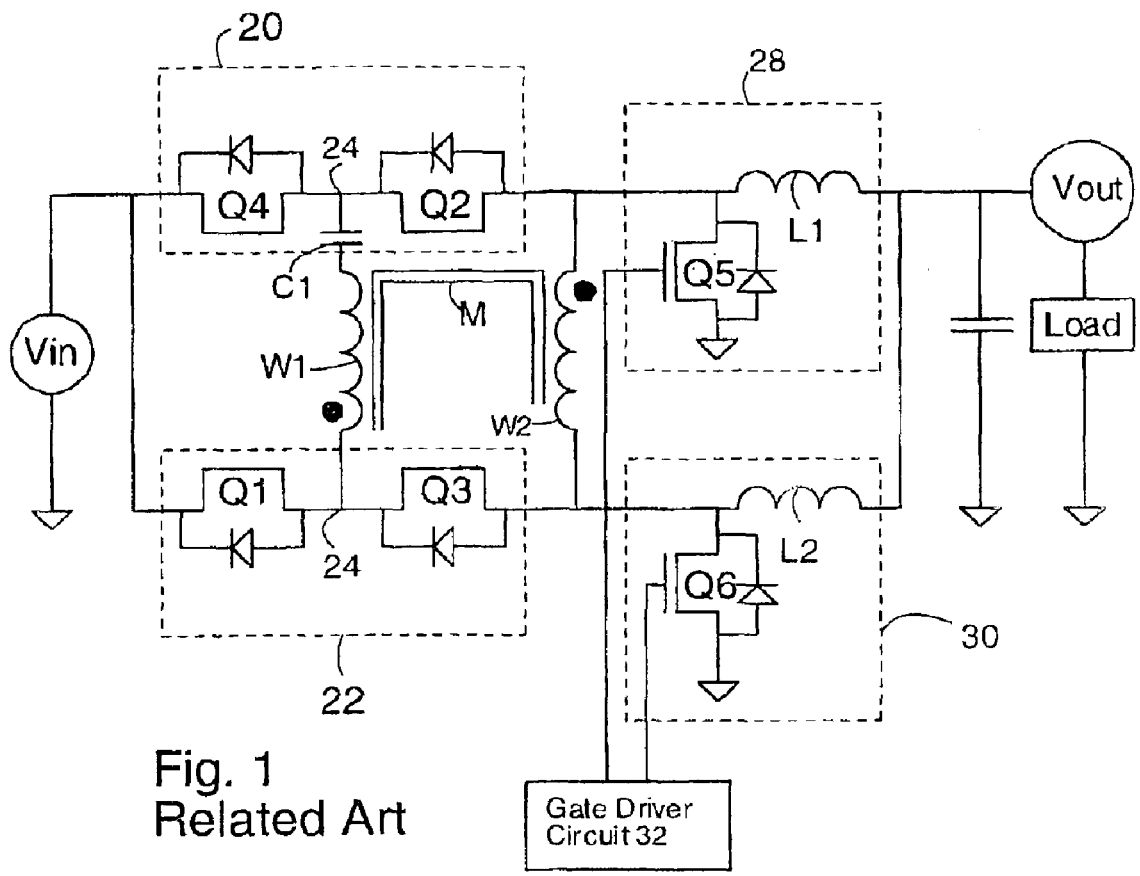
FIG. 1 (Related Art) shows a bridge-buck DC—DC converter according to co-pending U.S. patent application Ser. No. 10/339,576. The synchronous rectifiers in the circuit are controlled by a dedicated gate driver circuit.

FIG. 1 shows a bridge-buck type DC DC converter according to U.S. patent application Ser. No. 10/339,576 by Jia Wei et al. The bridge-buck circuit includes a bridge portion and buck portions 28 30. The bridge portions includes transistors Q1, Q2, Q3, and Q4. A first leg 20 comprises switches Q2 and Q4; second leg 22 comprises switches Q3 and Q1. A transformer primary winding W1 is connected across midpoints 24 of the legs 20 22. A transformer secondary winding W2 is connected across the legs 20 22 as shown. Primary W1 and secondary W2 are coupled through magnetic core M. It is noted that the windings W1 and W2 have anti-parallel polarities, as illustrated by the round dots. The transformer secondary winding W2 is connected between the legs 20 22 at a location downstream from the legs. Two buck output circuits 28 30 are connected to the bridge circuit, with one buck output circuit connected to each leg 20 22. Each buck output circuit has an output inductor L1 L2. Significantly, synchronous rectifiers Q5 and Q6 are controlled by a dedicated gate driver circuit 32. The bridge circuit may include optional capacitor C1 to prevent saturation of the magnetic core M.

Figure 2:
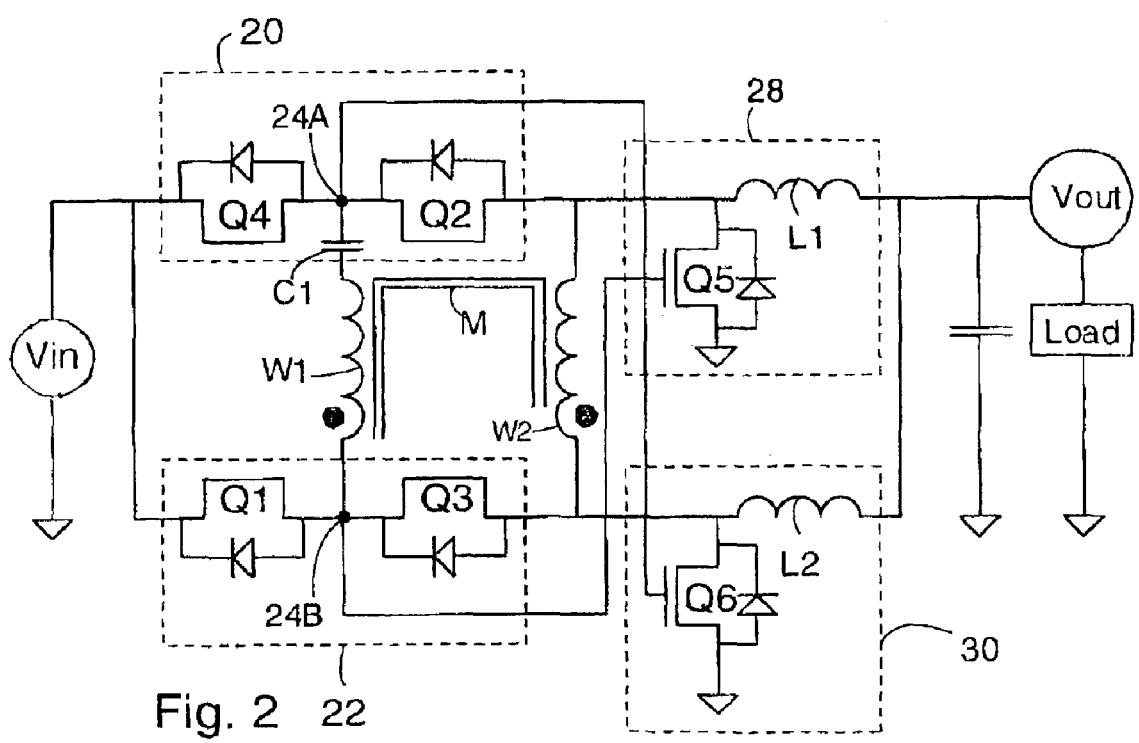
FIG. 2 shows a bridge-buck converter with self-driven synchronous rectifiers according to the present invention. The bridge-buck converter has transformer windings with parallel polarity.

FIG. 2 shows an embodiment of the present invention where the gate of synchronous rectifier Q5 is connected to the midpoint 24B of the opposite-side leg 22, and the gate of synchronous rectifier Q6 is connected to the midpoint 24A of the opposite-side leg 20. That is, each gate of the synchronous rectifiers Q5 and Q6 is connected to the midpoint of the opposite-side leg. Also, the transformer primary W1 and secondary W2 have parallel polarity, as indicated by the round dots. With these circuit features, the synchronous rectifiers Q5 and Q6 are turned on at appropriate times for DC—DC conversion. The circuit of FIG. 2 can be used with complementary switch control. Switches Q1–Q6 are preferably low ON-resistance MOSFETs or similar devices such as insulated gate bipolar transistors (IGBTs), or bipolar transistors (BJTs). Bipolar junction devices can be used in high voltage or high power is applications, for example.

Figure 3:
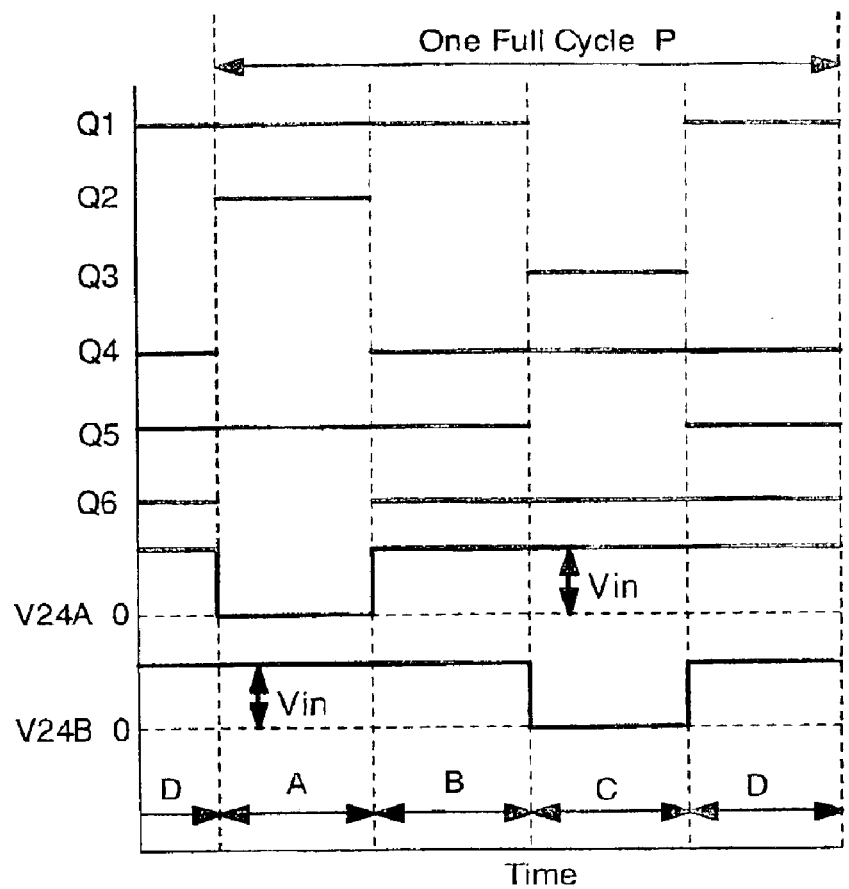
FIG. 3 shows a timing diagram for operating the circuit of FIG. 2 according to a complementary control scheme.

FIG. 3 shows a timing diagram for operating the circuit of FIG. 2 according to a complementary control scheme. Dark horizontal lines indicate when switches Q1–Q6 are ON. In a complementary control scheme, switches Q1 and Q3 are ON during opposite times, and switches Q2 and $Q^4$ are ON during opposite times. V24A and V24B are the voltages at the midpoints 24A and 24B, respectively. Switches Q5 and Q6 are turned ON when voltage at midpoints 24B and 24A are high, respectively. Primary winding W1 is charged during time periods A and C. Current is freewheeling through primary winding W1 during time periods B and D. One benefit of the present invention is that all the switches Q1–Q6 experience zero-voltage switching (ZVS), which increases circuit reliability and reduces switching losses.

Figure 4:
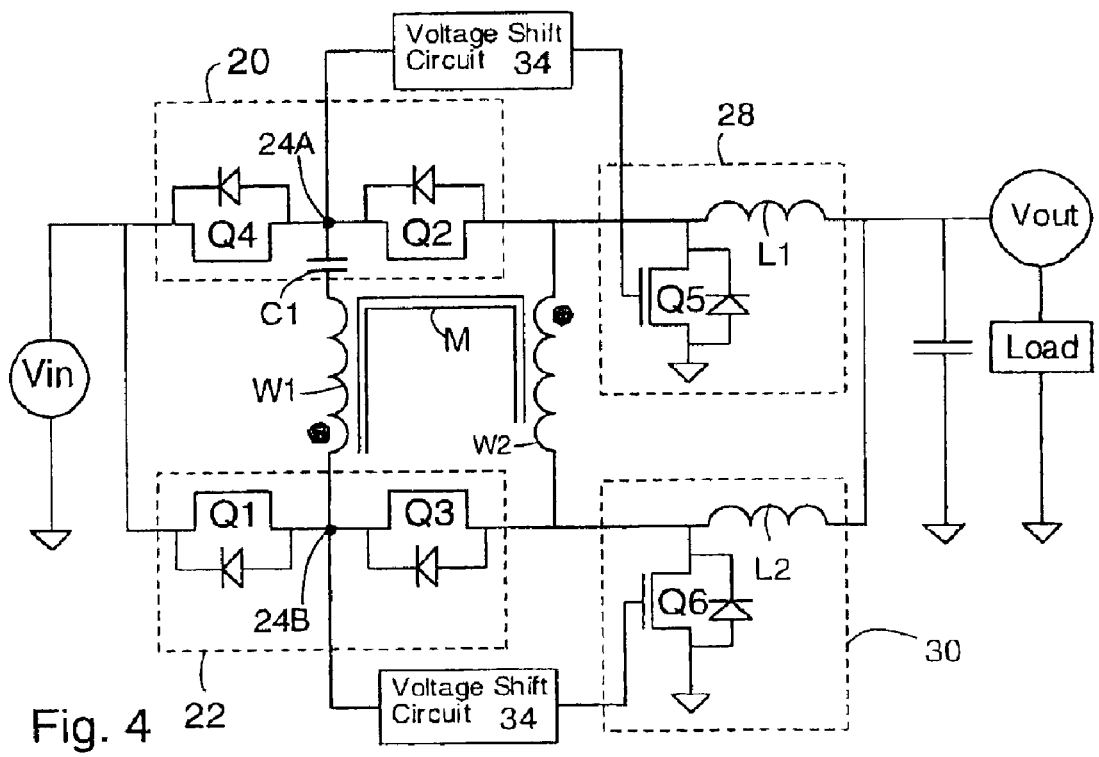
FIG. 4 shows a second bridge-buck converter with self-driven synchronous rectifiers according to the present invention. The bridge-buck converter of FIG. 4 has transformer windings with anti-parallel polarity.

FIG. 4 shows another embodiment of the present invention where the transformer primary W1 and secondary W2 have anti-parallel polarity, as illustrated by the round dots. The gate of switch Q5 is connected to midpoint 24A; gate of switch Q6 is connected to midpoint 24B. That is, the gate of each synchronous rectifier (Q5, Q6) is connected to the midpoint of the same-side leg. In this embodiment, voltage shift circuits 34 should be provided between the midpoints 24A 24B and the gates of rectifiers Q5 and Q6. This is because the voltage at the midpoints 24A 24B does not drop completely to zero at times when rectifiers Q5 and Q6 need to be OFF. The voltage shift circuits 34 can comprise a number of different circuits that provide reduced voltage (e.g. a Zener diode), as more fully explained below.

Figure 5:
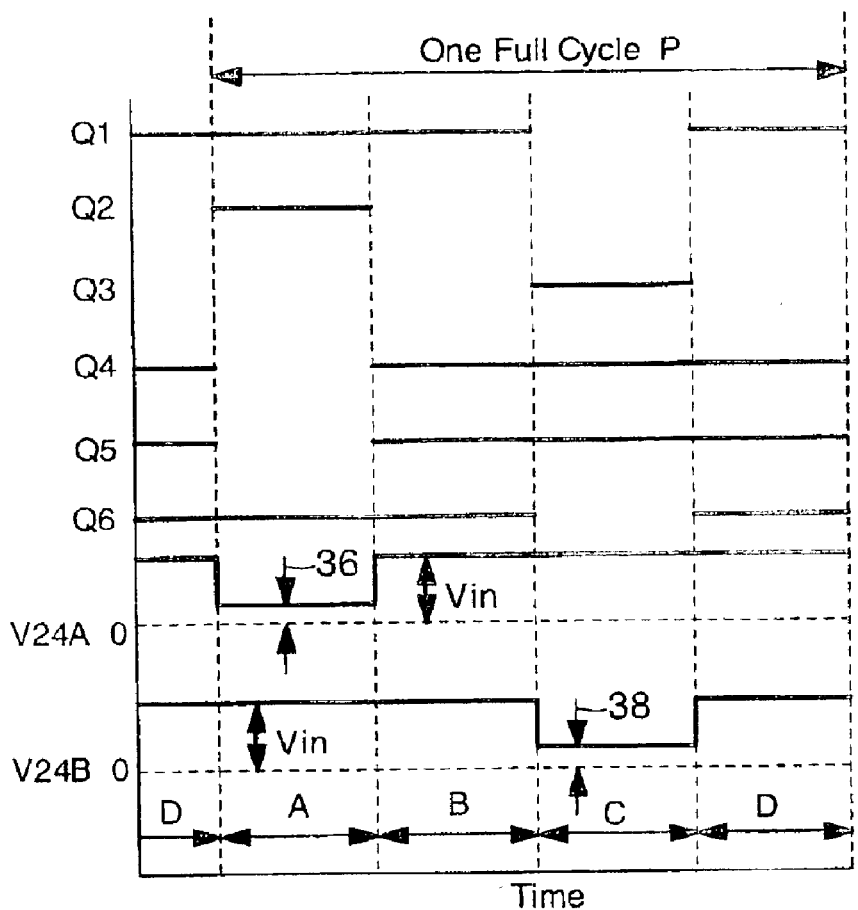
FIG. 5 shows a timing diagram for operating the circuit of FIG. 4 according to a complementary control scheme.

FIG. 5 shows a timing diagram for operating the circuit of FIG. 4 according to a complementary control scheme. Primary winding W1 is charged during time periods A and C, and winding W1 is freewheeling during time periods B and D. All the switches Q1–Q6 experience ZVS in the complementary control scheme of FIG. 5.

Significantly, it can be seen in FIG. 5 that the midpoint voltages V24A V24B never drop to zero. Voltage V24A at midpoint 24A is slightly positive by amount 36 during time period A, when rectifier Q5 must be OFF; voltage V24B at midpoint 24B is slightly positive by amount 38 during time period C when rectifier Q6 must be OFF. Voltage shift circuits 34 are provided so that the voltages provided to the gates of rectifiers Q5 and Q6 are zero during time periods A and C, respectively. For example, voltage shift circuits 34 can reduce V24A and V24B by a voltage of at least the amount illustrated by 36 and 38. Such a voltage shift will assure that the gates of Q5 and Q6 receive zero voltage during time periods A and C, respectively. Of course, the voltage shift circuits must be designed to provide a small enough voltage shift so that rectifiers Q5 and Q6 are ON at other times.

Figure 6A:
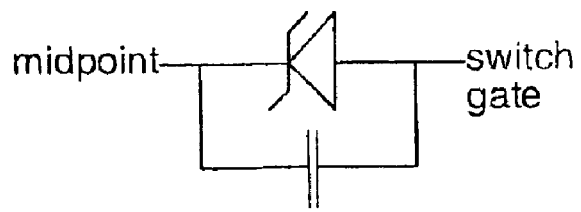
FIGS. 6a–6d show voltage shift circuits that can be used in the present invention.
Figure 6B:
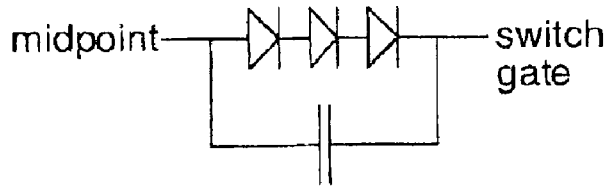
Figure 6C:
Figure 6D:

FIGS. 6a–6d show several specific voltage shift circuits 34 that can be used in the present invention. The voltage shift circuit of FIG. 6a comprises a Zener diode in parallel with a capacitor. In this embodiment, the reverse bias voltage drop of the Zener diode should be slightly greater than voltage 36 or 38. FIG. 6b illustrates another possible voltage shift circuit comprising a series of forward biased diodes, in parallel with a capacitor. Variations on the circuitry of FIGS. 6a and 6b are shown in FIGS. 6c and 6d, respectively. Other voltage shift circuits can also be used in the invention. Preferably, the voltage shift circuits provide a constant voltage drop.

Figure 7:
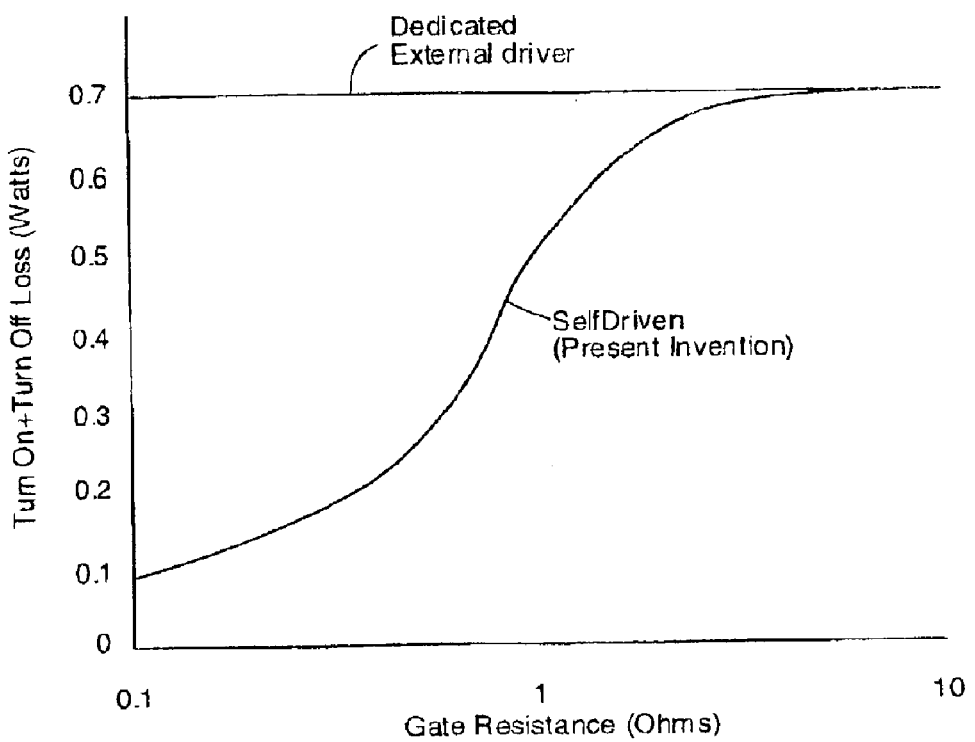
FIG. 7 shows a graph of driver power loss versus gate resistance for externally driven and self-driven synchronous rectifiers operated at 1 Mhz. Self driven synchronous rectifiers provide an efficiency boost in the invention because the driving circuit dissipates less energy compared to externally driven switches.

FIG. 7 illustrates the gate driver power loss in the present invention compared to external gate drivers. Specifically, FIG. 7 is a graph of turn-on+turn-off power loss versus gate resistance (i.e. gate resistance of rectifiers Q5 or Q6) for a MOSFET switch in an SO-8 package operated at about 1 Mhz. With conventional dedicated gate drivers, the power loss is unaffected by changes in gate resistance. With the self-driven synchronous rectifiers of the present invention, the power loss drops substantially with decreasing gate resistance. This difference occurs because external drivers essentially employ a voltage source for gate drive (i.e. a low-impedance power source), and the self-driven circuit essentially employs a current source for gate drive (i.e. a high-impedance power source). The high-impedance power source of the present invention is more power efficient.

In view of the graph of FIG. 7, it is preferred in the present invention for the synchronous rectifiers Q5 and Q6 to have relatively small gate resistance. For example, the gate resistance of the synchronous rectifiers can be less than 2, 1, 0.5 Ohms, or zero Ohm. As illustrated by the graph, the smaller the synchronous rectifier gate resistance, the greater the benefit in power efficiency.

It is noted that the circuit of FIG. 2 (parallel winding polarity) and circuit of FIG. 4 (anti-parallel winding polarity) have subtle performance differences. For example, the parallel polarity embodiment tends to have less ringing in the circuit, and therefore provides relatively clean gate drive signals for the synchronous rectifiers Q5 Q6. The anti-parallel polarity embodiment tends to have a smaller conduction loss in the transformer windings, since the transformer is operated as an autotransformer. In order to dampen ringing that may be present in the anti-parallel polarity embodiment, snubber circuits (known in the art) can be connected in parallel with synchronous rectifiers Q5 and Q6.

Figure 8:
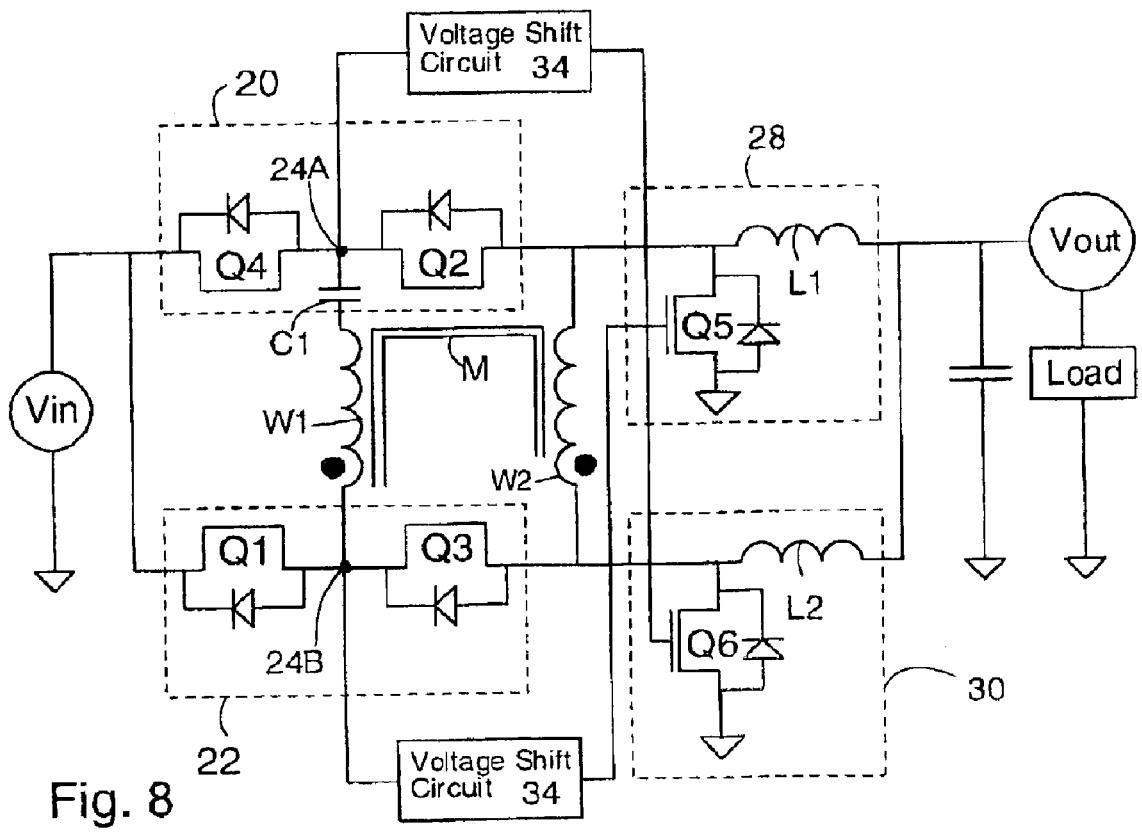
FIG. 8 shows an embodiment where the transformer has windings with parallel polarity, and the synchronous rectifier gates receive gate drive through voltage shift circuits.

FIG. 8 shows an alternative embodiment of the invention having parallel winding polarity and voltage shift circuits 34. In this case, voltage shift circuits may be necessary in case the voltage at midpoints 24A 24B exceeds the safe voltage level for the synchronous rectifier gates. The voltage shift circuits will assure that the gates of Q5 and Q6 are not damaged by excessive voltage at the midpoints 24A 24B.

Figure 9:
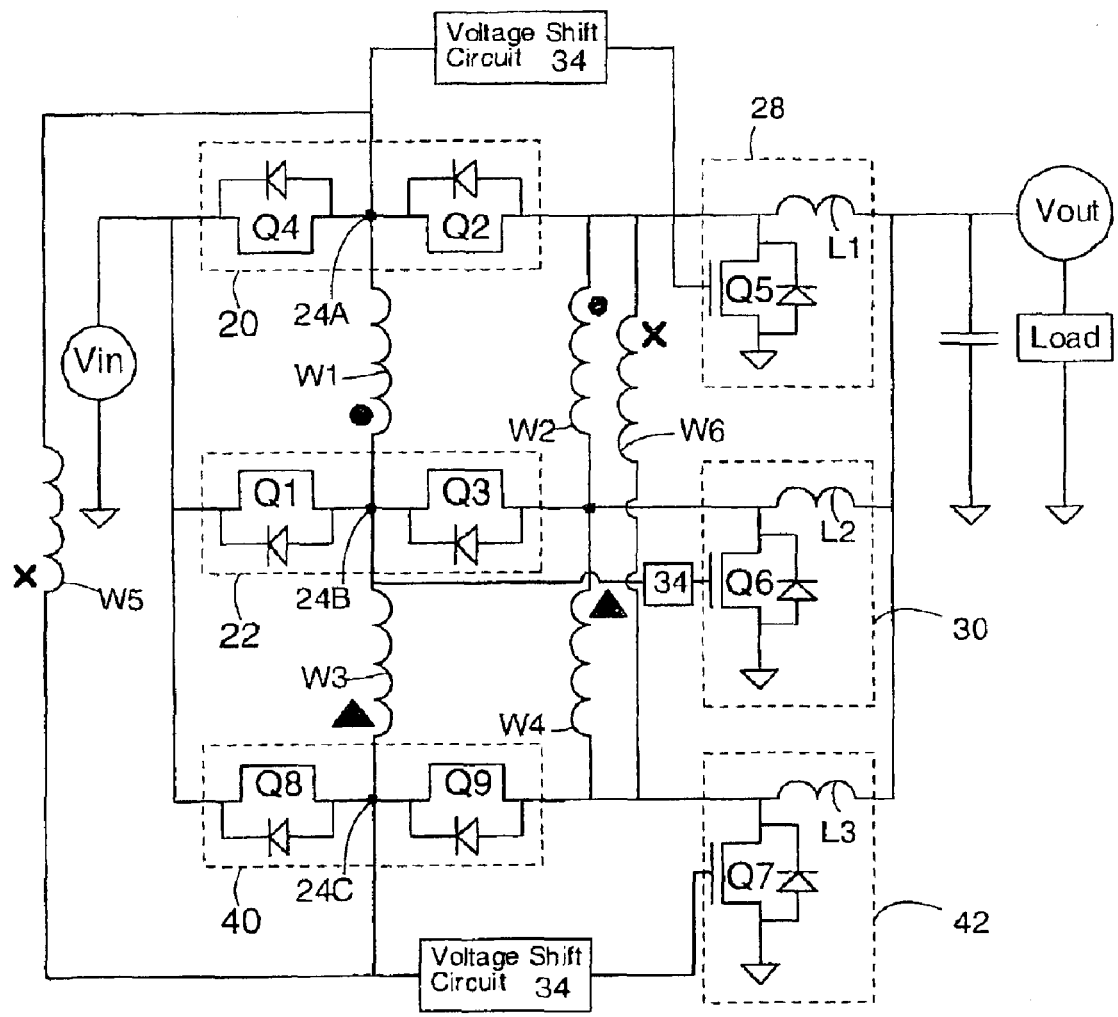
FIG. 9 shows a current tripler embodiment of the present invention, having three legs, three transformers, three midpoints and three buck output circuits.

FIG. 9 shows a current tripler embodiment of the invention. The current tripler embodiment has a bridge circuit with three legs 20 22 40 and each leg has a midpoint 24A 24B 24C. Transformer comprising windings W3 W4 is connected between the second leg 22 and third leg 40. Transformer comprising windings W5 W6 is connected between the first leg 20 and second leg 22. For clarity, magnetic cores of the transformers are not illustrated (windings W5 and W6 are coupled by a magnetic core). Each transformer has windings with antiparallel polarity. Each of the transformers is preferably identical. A third buck output circuit 42 is provided. The gate of each synchronous rectifier Q5 Q6 Q7 is coupled to the midpoint 24A 24B 24C of the associated leg 20 22 40, respectively. (e.g., synchronous rectifier Q7 is associated with leg 40). Each synchronous rectifier Q5 Q6 Q7 has an associated voltage shift circuit 34.

The circuit of FIG. 9 can be operated according to a complementary control scheme. It is noted that the circuit of FIG. 9 can easily be expanded by providing additional legs, midpoints, transformers and buck output circuits. For example, the present invention contemplates DC—DC converters with 4, 5, or more legs, midpoints, transformers and buck output circuits. However, it is noted that, if more than two legs and two buck output circuits are provided, then the transformers must have antiparallel winding polarity, and each synchronous rectifier must be driven by the associated leg, as shown in FIG. 9.

The present invention can be implemented in many ways, such as for example, using integrated magnetic technology, as known in the art. The present converters can be operated at high frequency (e.g. 500 Khz, 1 Mhz or higher). The present converters can be used to provide electrical power for many kinds of electrical circuits requiring well-regulated power, such as microprocessors, communications electronics and the like. The present converters are particularly suitable for providing low-voltage, high-current power from high voltage sources.

The present invention is unusual in that it provides self-drive for synchronous rectifiers in a non-isolated DC—DC converter. Providing self-drive for non-isolated converters extends the benefits of self-drive to this class of converters.

It will be clear to one skilled in the art that the above embodiment may be altered in many ways without departing from the scope of the invention. Accordingly, the scope of the invention should be determined by the following claims and their legal equivalents.

What is claimed is:

1. A DC—DC converter, comprising:
   a) a bridge circuit comprising two parallel legs with each leg having two electrical switches in series;
   b) a transformer with a primary winding connected between the legs at midpoints, and with a secondary winding connected between the two legs downstream from the switches;
   c) a pair of buck output circuits, with each buck circuit of the pair connected to each leg of the bridge circuit, and wherein each buck output circuit has a synchronous rectifier with a gate; and
   d) two electrical couplings, with each electrical coupling connecting one of the gates to one of the midpoints.

2. The DC—DC converter of claim 1, wherein the primary winding and the secondary winding have parallel polarity, and the synchronous rectifier gates are coupled to opposite-side midpoints.

3. The DC—DC converter of claim 1, wherein the primary winding and the secondary winding have anti-parallel polarity, and the synchronous rectifier gates are coupled to same-side midpoints.

4. The DC—DC converter of claim 3, wherein each electrical coupling comprises a voltage shift circuit.

5. The DC—DC converter of claim 1, wherein each electrical coupling comprises a voltage shift circuit.

6. The DC—DC converter of claim 5, wherein each voltage shift circuit comprises a Zener diode.

7. The DC—DC converter of claim 1 further including a driver for operating the bridge circuit switches according to a complementary control scheme.

8. The DC—DC converter of claim 1 wherein the transformer has a turns ratio in the range of 1:5 to 5:1.

9. The DC—DC converter of claim 1 wherein the synchronous rectifier gates have a gate resistance of less than 1 Ohm.

10. A DC—DC converter, comprising:
    a) a bridge circuit comprising two parallel legs with each leg having two electrical switches in series;
    b) a transformer with a primary winding connected between the legs at midpoints, and with a secondary winding connected between the two legs downstream from the switches, wherein the primary and secondary windings have parallel polarity;
    c) a pair of buck output circuits, with each buck circuit of the pair connected to each leg of the bridge circuit, and wherein each buck output circuit has a synchronous rectifier with a gate; and
    d) two electrical couplings, with each electrical coupling connecting one of the gates to one of the midpoints, wherein each gate is coupled to the opposite-side midpoint.

11. The DC—DC converter of claim 10, wherein the electrical couplings each comprise a voltage shift circuit.

12. The DC—DC converter of claim 11, wherein each voltage shift circuit comprises a Zener diode.

13. The DC—DC converter of claim 10 further including a driver for operating the bridge circuit switches according to a complementary control scheme.

14. The DC—DC converter of claim 10 wherein the transformer has a turns ratio in the range of 1:5 to 5:1.

15. The DC—DC converter of claim 10 wherein each electrical coupling is a direct electrical connection.

16. The DC—DC converter of claim 10 wherein the synchronous rectifier gates have a gate resistance of less than 1 Ohm.

17. A DC—DC converter, comprising:
    a) a bridge circuit comprising at least three parallel legs with each leg having two electrical switches in series;
    b) at least three transformers, with each transformer having a primary winding connected between the legs at midpoints, and with a secondary winding connected between the legs downstream from the switches, wherein the primary and secondary windings have anti-parallel polarity;
    c) at least three buck output circuits, with each buck output circuit connected to each leg of the bridge circuit, and wherein each buck output circuit has a synchronous rectifier with a gate; and
    d) an electrical coupling between each gate and the midpoint associated with each gate.

18. The DC—DC converter of claim 17 wherein the electrical coupling comprises a voltage shift circuit.

19. The DC—DC converter of claim 18, wherein each voltage shift circuit comprises a Zener diode.

20. The DC—DC converter of claim 17 wherein the synchronous rectifier gates have a gate resistance of less than 1 Ohm.

* * * * *